July 19, 1966 C. JONES 3,261,542
ROTOR AND SEAL CONSTRUCTION FOR ROTARY MECHANISMS
Filed May 8, 1963 2 Sheets-Sheet 1

INVENTOR.
CHARLES JONES
BY
Thomas W. Kennedy
ATTORNEY

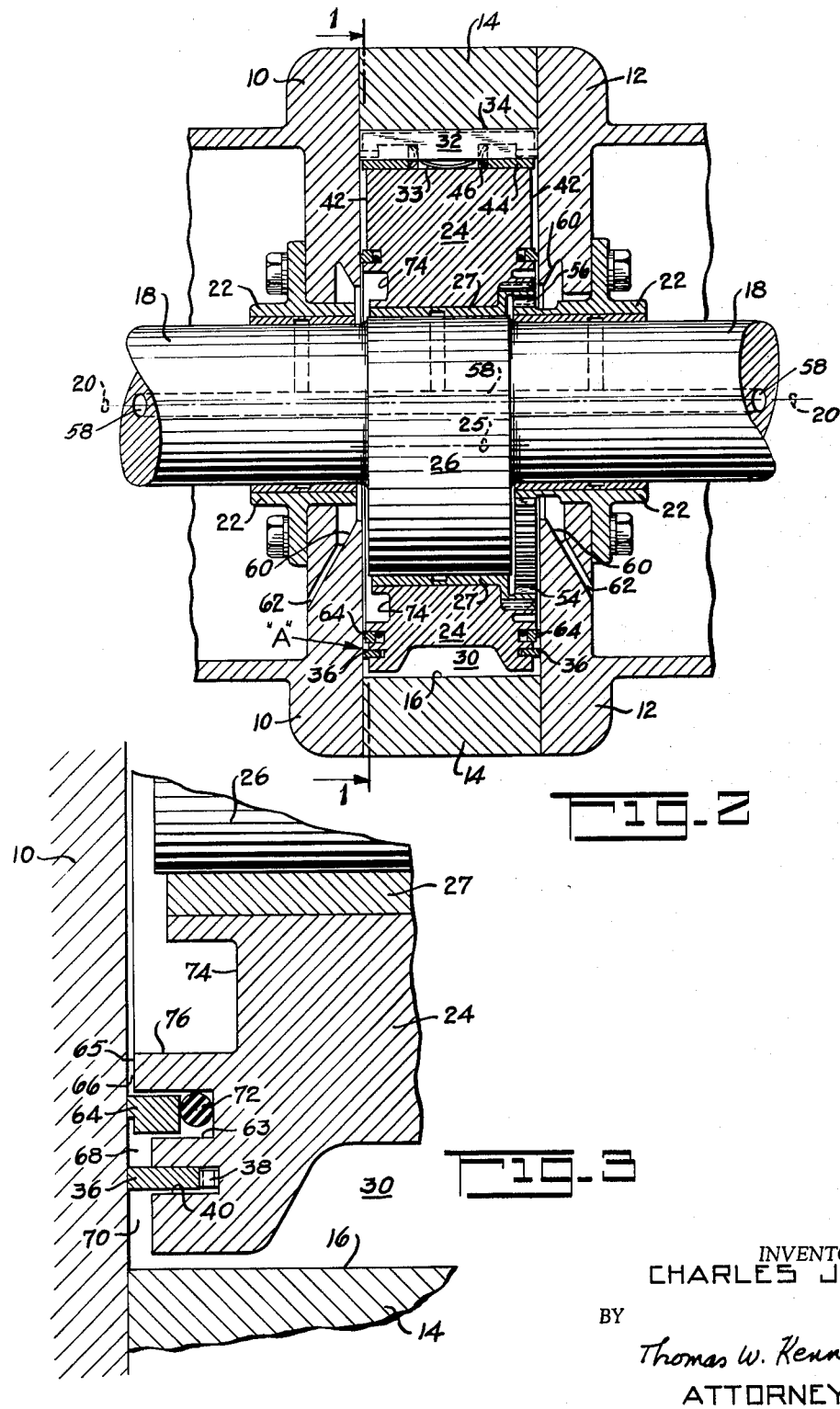

United States Patent Office

3,261,542
Patented July 19, 1966

3,261,542
ROTOR AND SEAL CONSTRUCTION FOR
ROTARY MECHANISMS
Charles Jones, Paramus, N.J., assignor to Curtiss-Wright
Corporation, a corporation of Delaware
Filed May 8, 1963, Ser. No. 278,862
11 Claims. (Cl. 230—145)

The present invention relates broadly to the art of rotary mechanisms and is particularly directed to rotor end face bearings for such rotary mechanisms.

The invention is particularly useful in connection with rotary mechanisms similar to that disclosed in United States Patent No. 2,988,065, although as will become apparent, this invention is not limited to this specific type of rotary mechanism. In the following description the invention is described in relation to an internal combustion engine, but the invention is also suitable to other forms of rotary mechanisms such as fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is co-axial with the outer body and journaled in bearings carried by the outer body end walls.

The outer body has axially-spaced end walls and a peripheral wall interconnecting the end walls to form said cavity; the inner surface of the cavity peripheral wall having a multi-lobed profile which preferably is basically an epitrochoid. The inner body or rotor has end faces carrying end-face seal means and intermediate seal elements disposed adjacent to said outer body end walls for sealing cooperation therewith, and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies.

The bearings between the inner body and the shaft eccentric and the shaft bearings are supplied with lubricating oil under pressure. The inner body is provided with oil sealing means on each end face for oil sealing contact with their adjacent outer body end walls to minimize the passage of oil radially outwardly toward the working chambers between the inner body end faces and outer body end walls.

During operation of the rotary engine, the rotor may have a shifting movement in an axial direction in addition to its orbital and rotary motion upon relative rotation of the rotor and housing. Such shifting movement may be due to variations in the difference between the gas pressures at the two end faces of the rotor or due to other factors, e.g. the gear teeth. Such axial shifting of the rotor may therefore cause pumping of the oil radially outwardly along the housing end walls and may cause scuffing of the rotor end faces as a result of physical contact of said end faces with the outer body end walls.

In prior combustion engines of this type, each said rotor end face has grooves in which said end face gas and oil seal means are received. The gas pressure in the engine working chambers causes each said gas seal and oil seal to bear against a side wall of its groove. When the rotor shifts axially the friction may cause each said seal to be disengaged or carried off from the end wall by the rotor, leaving a gap between each said seal and said adjacent end wall resulting in leakage past said seals. Furthermore, each of said end face seal grooves carries spring means for urging its seal outwardly against the adjacent end wall. Each said spring means also helps to prevent its rotor end face from contacting the adjacent end wall, because as said face moves toward said wall the spring therebetween is compressed and exerts a greater reaction therebetween. Due to such spring deflections caused by the rotor shifting, it is difficult to provide a suitable spring means with a low enough spring pressure to prevent excessive seal wearing and a high enough spring pressure to provide effective sealing.

An object of the present invention is the provision of a rotary combustion engine having an improved rotor which minimizes the relative axial movement between the rotor and housing and improves sealing.

Specifically, instead of providing the rotor with a profile in any plane including the rotor in which the width of the portion of the rotor radially inwardly of the oil seal means is substantially the same width as rotor portions radially outward therefrom, in this invention the rotor profile is such that the width of the portion of the rotor radially inwardly of the oil seal means is larger than that of the rotor portions radially outwardly of the oil seal means, thereby forming a rotor hub portion inwardly of the oil seal and having a minimum axial clearance from the end wall of the outer body.

Another object is to improve the inward scraping action by said rotor and seal structure on the oil film on the housing end wall surfaces.

Another object of this invention is to provide a novel structure which minimizes the disengaging of the rotor end face seals from the end walls and to improve the sealing of the working chambers.

Other objects of the invention will become apparent upon reading the annexed detail description in connection with the drawings in which:

FIG. 2 is a longitudinal sectional view of a rotary combustion engine as taken along line 2—2 of FIG. 1; and FIG. 3 is an enlarged view of portion "A" of FIG. 2.

Figure 1:
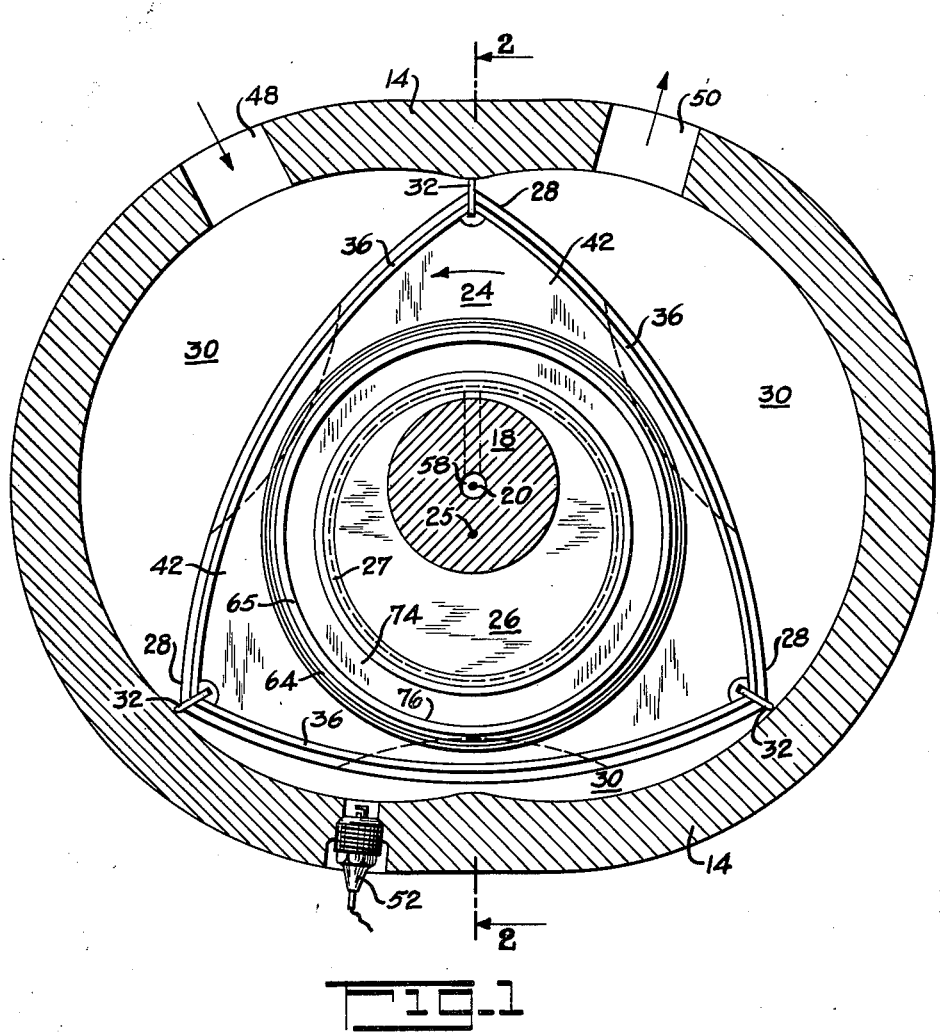
FIG. 1 is a schematic transverse sectional view of a rotary combustion engine embodying this invention, as taken along line 1—1 of FIG. 2.

Referring to the drawings, the housing or outer body of a rotary combustion engine comprises spaced end walls 10 and 12, and a peripheral wall 14 disposed between and interconnecting said end walls to form a cavity therebetween. The inner surface 16 of the peripheral wall 14 preferably has a multilobed profile in cross-section which preferably is basically an epitrochoid.

A shaft 18, having an axis 20, which is co-axial with the axis of the outer body cavity and along which the end walls 10 and 12 are spaced, extends through the outer body and is journaled in bearings 22 carried by the end walls 10 and 12. The shaft 18 has an eccentric portion 26 on which an inner body or rotor 24 is journaled. The inner body 24 and the eccentric 26 have a common axis 25 which is laterally spaced from the shaft axis 20. The inner body 24 has a journal bearing 27 to receive the shaft eccentric 26.

The inner body 24 is received within the outer body cavity between its end walls 10 and 12 and has a plurality of circumferentially-spaced apex portions 28 about its outer periphery to form a plurality of working chambers 30 between the inner and outer bodies which vary in volume upon rotation of the inner body relative to the outer body. The inner body 24 also has apex seal means 32 received in an apex groove 34 at each of said apex portions 28 which are urged by spring means 33 in sealing engagement with the peripheral wall inner surface, and end face seal means 36 received in end face groove 40 at each of its end faces 42 which are in sealing engagement with the end walls 10 and 12. Also, suitable and face spring means 38 may be provided behind each end face seal means 36 for helping to urge said seal means against the inner faces of the end walls 10 and 12.

The bottom of each apex groove 34 has an enlarged cylindrical bore portion at each end of the groove, and an axially-movable intermediate seal element 44 is slidably fitted within such cylindrical bore portion and urged axially against the adjacent end wall 10 or 12 preferably by spring means 46 and gas pressure. Each end of each apex seal means 32 is in sealing cooperation with an intermediate seal element 44.

Between the intermediate seal elements 44, disposed at the rotor apex portions 28 on each end face of the rotor 24 adjacent to the rotor periphery, and associated with a working chamber 30, are end face seal strips 36, each of which extends from one intermediate seal element to an adjacent element 44 and is received in a groove 40 in its rotor end face 42. Suitable spring means 38 may be provided behind each end face seal 36 for helping to urge the seal strip against the adjacent end walls 10 or 12 of the outer body.

Said apex seal means 32 together with said end face seal means 36 and said intermediate seal elements 44 forms a continuous seal about the working chambers 30. During rotation of the inner body 24, the apex seal means 32 slide continuously along with their outer edges in bearing against the inner surface 16 of the peripheral wall 14, and the intermediate seal elements 44 and end face seal strips 36 slide continuously along the flat inner surfaces of the end walls 10 and 12. The gas pressure within the working chambers 30 urges each end face seal strip 36 radially inwardly against the radially inner face of its groove 40. The gas pressure also acts behind each end face seal strip 36 to add to the pressure of the spring 38 against said end face seal strip urging the end face seal strips against the outer body end walls 10 or 12.

The outer body has intake port means 48 for supply of an intake charge of the working chambers 30 and has exhaust port means 50 for discharge of exhaust gases from the engine. If needed, a suitable spark plug 52 may be provided to ignite the intake charge. In order to maintain the relative motion of the inner body 24, relative to the stationary outer body an internal gear 54 is, as illustrated, secured to the inner body co-axially with the inner body axis 25 and is disposed in mesh with a fixed gear 56 secured to the outer body co-axial with the outer body axis 20.

The seal strips 36 and the intermediate seal members 44 at each rotor end face 42 cooperate to provide a continuous contact area in sealing engagement with the adjacent end wall 10 or 12 of the outer body, said seal contact area encircling the rotor axis and being disposed adjacent to the rotor periphery whereby a seal is provided adjacent to the rotor periphery against inward flow of combustion gases between the rotor end faces 42 and the end walls 10 and 12.

The bearing surfaces between the rotor journal bearing 27 and shaft eccentric 26 and also the shaft bearings 22 are supplied with lubricating oil through a shaft passage 58. During engine operation, oil from the bearings 22 and 27 collects in the space at the ends of the bearings and collects in the annular gutter or groove 60 in the end walls from which it drains through openings 62 to a suitable sump (not shown).

In addition, suitable oil sealing means such as the ring 64 is disposed in a circular co-axial groove 63 in each end face of the rotor 24 radially outwardly of the journal bearing 27 for said rotor on the shaft eccentric 26 and radially inwardly of the end face seal strips 36. Said oil seal means 64 is provided to minimize leakage of lubricating oil radially outwardly beyond said seal means between their associated rotor end faces 42 and outer body end walls 10 and 12.

The engine so far described is substantially similar to the engine disclosed in the aforementioned United States Patent Number 2,988,065 and for additional description reference is made to said patent. The seal arrangement so far described is substantially similar to the seal arrangement disclosed in United States Patent Number 3,033,180 and reference is made to said patent.

According to the invention, the axial width of the rotor 24 is made slightly larger radially inwardly of the oil sealing means 64 than the corresponding axial width of the rotor 24 radially outwardly of said oil sealing means such that radially inwardly of this oil seal ring 64 the rotor has a hub portion projecting axially slightly from each rotor end face and such that the axial width of the rotor is a maximum at said hub portions. Since the flat inner faces of the two end walls 10 and 12 of the housing are made substantially parallel, the axial clearance 66 between either of said rotor end faces and its adjacent housing end wall 10 or 12 is therefore slightly less at the rotor hub 65 on the radially inner side of said oil sealing means 64 than the adjacent clearance 68 of the end face portion bounded by the gas seal 36 and oil seal 64 and also slightly less than the adjacent clearance 70 which is radially outwardly of the gas seals 36. Both of these clearances 68 and 70 outwardly of said oil seal may be equal. Furthermore, the rotor hub portions 65 with their smaller axial clearances 66, are disposed radially inwardly of the oil sealing means 64 and therefore are disposed in a region which is always wet with lubricating oil. Accordingly, the rotor hub portions 65 can remain in contact with the adjacent end wall 10 or 12, and can carry the rotor axial load without scarring of said rotor end face and adjacent end wall. If the rotor is made of iron or iron base material its hub portions 65 will have low friction and good bearing characteristics relative to the end walls 10 and 12. If the rotor is made of other materials such as aluminum it may be necessary to finish said bearing surface with plated coating such as Babbitt's metal. Further, since this lubricated hub portion 65 with the smaller clearance 66 is also cooled by the lubricating oil, the axial width of the rotor between said hub portion does not materially increase in temperature and expand axially during engine operation and cause binding or seizing of the rotor 24 during engine operation. In addition, although the radially outer end face portions with the larger clearances 68 and 70 increase substantially more in temperatures and therefore expand substantially more than said inner end face portion with the smaller clearance 66 during engine operation, said larger axial clearances 68 and 70 at said outer end face portions are made sufficiently large to assure against contact of said wall surfaces with said wall theeby preventing scarring of said wall surfaces. It is clear therefore that the axial end surfaces of the rotor hub portions 65 function as axial thrust bearing surfaces between the rotor and the outer body end walls 10 and 12.

The axial clearance 66 at each end of said inner or hub portion 65 of the end face is preferably not more than fifteen hundredths (0.15) of one percent of the distance between the end walls 10 and 12 of said outer body when the rotor is centered between the end walls. Thus, in a particular rotary engine in which the distance between the end walls 10 and 12 is approximately three inches, it was found that by providing an inner axial clearance 66 of about 0.0035 plus or minus 0.0010 inch (with the rotor centered between the end walls) and each outer axial clearance 68 and 70 of about 0.0085 plus or minus 0.0020 inch, there was a substantial savings in oil consumption. While said value for the outermost axial clearance 70 occurred during the shut down or cold condition, said value 70 was decreased by about 0.0030 inch during engine operation due to the expansion in the axial width of the rotor 24. While these actual clearance dimensions and tolerances only apply to a particular rotary engine having about a three-inch rotor width, it is obvious that said dimensions would be increased for larger-size engines with larger-width rotors of the same type. Likewise, said clearance and tolerance dimensions preferably would be decreased for smaller-size engines except of course where this dimension becomes too small for conventional fabrication.

Experiments with said engine with a three-inch wide rotor 24 also demonstrated that if the inner surface of each end wall, engaged by a hub portion 65 of each end face, has a flatness within a tolerance of 0.002 inch high to low, there was a still larger savings in oil consumption. Said preferred tolerance in surface flatness means that each low point on said surface is not more than a distance of 0.0002 inch from a plane across the high points on said surface.

The hub portion 65 of the rotor end face with the smaller clearance 66 preferably has an annular step portion 74 of reduced axial width on its radially inward side to form an inwardly facing shoulder 76. Thus, the axially outer corner of the shoulder 76 forms a scraping edge encircling the rotor axis 25 for scraping inwardly the oil film which adheres to the end wall face. In addition, such a protruding end face hub portion 65 with its smaller clearance 66 prevents splashing of oil directly against the oil seal 64 as occurs in the prior art form of rotor and seal structure.

Preferably, the rotor hub portions 65 are disposed immediately adjacent the oil seal groove 63, as illustrated, whereby the inner side walls of said grooves are of increased axial length to provide more support for the oil seals. In addition, in order to minimize the clearance between the rotor and the outer body end walls outwardly of the oil seals 64 and still avoid physical contact between these outer portions of the rotor and said end walls during engine operation notwithstanding thermal expansion of the rotor, the distance which each rotor hub 65 projects axially beyond the rotor portion on the radially outer side of the adjacent oil seal groove preferably is not greater than two-tenths of one percent of said rotor width.

The axial clearance 66 between the rotor hub portions 65 and the adjacent end walls 10 and 12 is also substantially smaller than has been used in prior art engines of this type, and therefore the previously mentioned axial shifting of the engine rotor 24 is greatly minimized. Since the axial deflection of the oil seal 64 is also minimized it is possible to use a ring of rubber-like material as the oil seal spring means 72 for urging each oil seal into engagement with the end wall 10 or 12. The rubber ring spring 72 is also in sealing engagement with the axially inner edge of said oil seal 64 and with the bottom of said oil seal groove 63 whereby leakage behind the oil seal is also prevented.

Conventional thrust bearings are not applicable to the rotor of this type of rotary engine because of the orbital motion of said rotor. In addition, a conventional thrust bearing which would be separate from said rotor, would have clearances between the rotor end face and said bearing, and also between said bearing and the end wall whereby the rotor would have a greater freedom of axial movement than with the present invention.

As stated previously, because of friction between the gas and oil seals 36 and 64 and the sidewalls of their grooves, any axial shifting of the rotor tends to cause these seals to shift with the rotor thereby lifting the seals off the end walls 10 and 12. By use of said projecting end face hub portions 65 with its smaller axial clearance 66 from said adjacent end wall 10 or 12, not only is the axial shifting of the rotor 24 minimized, but as a result any lifting of the gas and oil seals 36 and 64 off the end walls 10 and 12 is likewise minimized. Thus, by minimizing said shifting of the rotor, said gas and oil seals 36 and 64 become more effective seals. Furthermore, because of such reduction in axial shifting of said rotor 24, any slight twisting of said rotor is also minimized during operation, that is, angular deviation of the rotor axis 25.

While the present invention has been described in detail in its present preferred embodiment, it will be obvious to those skilled in the art after understanding this invention that various changes and modifications may be made therein without departing from the spirit and scope thereof. It is intended by the appended claims to cover all such modifications.

What is claimed is:

1. A rotary combustion engine comprising an outer body having axially-spaced end walls and a peripheral wall interconnecting said end walls to form a cavity therebetween; an inner rotor received within said cavity with the axis of the inner rotor being laterally spaced but parallel to the axis of said outer body cavity; said inner rotor having axially-spaced end faces adjacent to said end walls and also having a plurality of circumferentially-spaced apex portions for engagement with the inner surface of said peripheral wall to form a plurality of working chambers between said rotor and peripheral wall which vary in volume upon relative rotation of said rotor and outer body; oil seal ring means carried by an end face of said rotor for engagement with the adjacent end wall of the outer body with said oil seal ring means co-axially encircling the axis of said rotor; said rotor having a continuous annular hub portion projecting axially at each end face of the rotor and disposed radially inwardly of the oil seal ring means carried by said end face such that the axial width of the rotor at said hub portions is greater than the axial rotor width radially outwardly of said seal ring means and such that the axial clearance between the rotor and the outer body end walls is a minimum at said hub portions to restrain axial movement of said rotor.

2. A rotary combustion engine as claimed in claim 1 and in which with the rotor centered between the end walls of the outer body said minimum axial clearance is not more than fifteen-hundredths of one percent of the distance between the end walls of said outer body.

3. A rotary combustion engine as claimed in claim 1 and in which said axial clearance between each rotor end face and the adjacent outer body end wall is not greater than 0.0045 inch when the rotor is symmetrically positioned between said end walls and the distance between said walls is approximately three inches.

4. A rotary combustion engine as claimed in claim 1 and in which the inner surface of each end wall engaged by a hub portion of a rotor end face has a flatness such that the maximum distance to a low point on said surface from a plane across its high points is no greater than 0.0002 inch.

5. A rotary combustion engine as claimed in claim 1 and in which each said hub portion has a reduced width portion encircling said rotor axis and forming a step portion so that said rotor width at said hub portion is greater on the radially outer side of said step than on the radially inner side of said step.

6. A rotary combustion engine as claimed in claim 1 and in which each said oil seal ring means is received within an annular groove which is disposed immediately adjacent said hub portion and radially outwardly thereof with the inner side wall of said groove projecting axially beyond the outer side wall of said groove.

7. A rotary combustion engine as claimed in claim 1 and in which said projection of said hub portion is not more than two-tenths of one percent of said rotor width.

8. A rotor for use in a rotary internal combustion engine, said rotor comprising a multiapexed body having a longitudinal axis, a pair of end faces spaced along said axis, a plurality of peripheral working faces interconnecting said end faces, a continuous annular hub portion projecting axially from each of said end faces co-axially therewith, and an annular oil seal groove in each of said end faces surrounding said hub portions immediately adjacent thereto, said rotor in the portion radially outward from said grooves having a smaller axial dimension than the overall axial extent of said rotor at the hub portion.

9. A rotor as in claim 8, wherein the axial projection of each of said hub portions beyond its end face is not greater than .2% of the distance between said end faces.

10. A rotor as in claim 8, having an annular oil-reservoir groove in each end face radially inward of said hub portions and coaxial therewith, the radially outer wall of said groove forming the radially inner wall of said hub portion.

11. A rotary combustion engine comprising in combination an outer body having a basically epitrochoid peripheral wall and a pair of parallel end walls spaced apart by said peripheral wall and defining therewith a cavity having a longitudinal axis; a shaft transpiercing said end walls and having an eccentric portion disposed within said cavity, said eccentric portion having an axis displaced from and parallel to said outer body axis and planetating hterearound; a multiapexed rotor disposed within said cavity and mounted on said eccentric portion for rotation about said eccentric axis with said apexes sweeping the inner surface of said peripheral wall in sealing relation thereto and forming therewith a plurality of working chambers which vary in volume on relative rotation of said rotor and outer body; said rotor having axially-spaced end faces adjacent to said end walls; each of said rotor end faces bearing a plurality of end face seal strips, there being one such end face seal strip extending between each pair of adjacent apex portions and generally parallel to the rotor edge, said end face seal seal strips forming together with said apex portions a continuous gas pressure seal about each of said working chambers; each of said rotor end faces bearing a resiliently pressed oil seal ring coaxial with said rotor and radially inward from said gas seal strips and sweeping said end faces to prevent oil leakage radially outward; each of said rotor end faces having a continuous annular hub portion projecting axially outwardly therefrom and disposed radially inwardly from said oil seal rings to restrain axial movement of said rotor and to restrict the flow of oil toward said oil seal rings; said rotor in the portion radially outward form said oil seal rings having a smaller axial dimension than the overall axial extent of said rotor at the hub portion, to permit thermal expansion of said radially outward portion without contact thereof with the end walls.

UNITED STATES PATENTS

References Cited by the Examiner

| 2,988,065 | 6/1961 | Wankel et al. | 103—130 |
| 3,033,180 | 5/1962 | Bentele | 103—130 |
| 3,081,745 | 3/1963 | Hurley | 123—8 |
| 3,139,036 | 6/1964 | McGill | 230—145 |
| 3,180,563 | 4/1965 | Jones et al. | 230—145 |
| 3,193,052 | 7/1965 | Baumler et al. | 184—1 |
| 3,193,188 | 7/1965 | Bentele | 123—8 |

MARK NEWMAN, *Primary Examiner.*

WILBUR J, GOODLIN, *Examiner.*